US012749730B2

(12) United States Patent
Naruke

(10) Patent No.: US 12,749,730 B2
(45) Date of Patent: Sep. 29, 2026

(54) VEHICLE BATTERY PACK

(71) Applicant: SUBARU CORPORATION, Tokyo (JP)

(72) Inventor: Toshiaki Naruke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 566 days.

(21) Appl. No.: 18/384,961

(22) Filed: Oct. 30, 2023

(65) Prior Publication Data

US 2024/0154199 A1 May 9, 2024

(30) Foreign Application Priority Data

Nov. 9, 2022 (JP) ................................ 2022-179581

(51) Int. Cl.

| | |
|---|---|
| ***H01M 10/613*** | (2014.01) |
| ***B60L 50/50*** | (2019.01) |
| ***H01M 10/625*** | (2014.01) |
| ***H01M 10/6556*** | (2014.01) |
| ***H01M 10/6567*** | (2014.01) |
| ***H01M 10/6568*** | (2014.01) |
| ***H01M 50/204*** | (2021.01) |
| ***H01M 50/233*** | (2021.01) |
| ***H01M 50/317*** | (2021.01) |

(52) U.S. Cl.
CPC ........... *H01M 10/613* (2015.04); *B60L 50/50* (2019.02); *H01M 10/625* (2015.04); *H01M 10/6556* (2015.04); *H01M 10/6567* (2015.04); *H01M 10/6568* (2015.04); *H01M 50/204* (2021.01); *H01M 50/233* (2021.01); *H01M 50/317* (2021.01); *H01M 2220/20* (2013.01)

(58) Field of Classification Search
CPC .......... B60L 50/50; B60L 50/64; B60L 58/26; H01M 10/613; H01M 10/625; H01M 10/6556; H01M 10/6567; H01M 10/6568; H01M 50/204; H01M 50/233; H01M 50/244; H01M 50/249; H01M 50/317; H01M 2220/20
See application file for complete search history.

(56) References Cited

U.S. PATENT DOCUMENTS 9,912,019 B2 * 3/2018 Andres ............. H01M 10/6569
2022/0158268 A1 5/2022 Naruke et al.

FOREIGN PATENT DOCUMENTS

DE 102019109750 A1 * 10/2020 ........ H01M 10/6567
JP 2022-80546 A 5/2022
KR 20170095165 A * 8/2017 ............ H01M 50/24

OTHER PUBLICATIONS

Machine translation of KR-20170095165-A (Year: 2017).*
Machine translation of DE-102019109750-A1 (Year: 2019).*

* cited by examiner

*Primary Examiner* — Timothy C Cleveland
(74) *Attorney, Agent, or Firm* — TROUTMAN PEPPER LOCKE LLP

(57) ABSTRACT

A vehicle battery pack includes a battery module, a case, a cooling unit, and a chiller. The battery module includes battery cells. The case has an internal space in which the battery module is disposed. The case includes a breather valve through which the internal space communicates with an external space. The cooling unit is configured to cool the battery module by using a fluid. The chiller is configured to take heat from the fluid by heat exchange. The chiller is provided closer to the breather valve than the battery module.

7 Claims, 4 Drawing Sheets

VEHICLE BATTERY PACK

CROSS-REFERENCE TO RELATED APPLICATION

The present application claims priority from Japanese Patent Application No. 2022-179581 filed on Nov. 9, 2022, the entire contents of which are hereby incorporated by reference.

BACKGROUND

The disclosure relates to the technical field of a battery pack installed in a vehicle.

For example, an electrically-driven vehicle, such as a hybrid vehicle or an electric vehicle, that can drive wheels by the power of an electric motor has a battery (secondary battery) for supplying electric power to the electric motor.

Since the discharge characteristics of a battery generally change with temperature, the battery is cooled when the temperature of the battery is high.

A water cooling system that circulates cooling a fluid, such as cooling water, is used as a battery cooling system. Some water cooling systems have a chiller for cooling the cooling fluid, as described in Japanese Unexamined Patent Application Publication No. 2022-080546, for example.

SUMMARY

An aspect of the disclosure provides a vehicle battery pack including a battery module, a case, a cooling unit, and a chiller. The battery module includes battery cells. The case has an internal space in which the battery module is disposed. The case includes a breather valve through which the internal space communicates with an external space. The cooling unit is configured to cool the battery module by using a fluid. The chiller is configured to take heat from the fluid by heat exchange. The chiller is provided closer to the breather valve than the battery module.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

A chiller cools a cooling fluid by heat exchange such that the cooling fluid can be repeatedly used to cool the battery again, and there is a known chiller that uses an air conditioner refrigerant gas for this heat exchange.

The air conditioner refrigerant gas is used to cool the air in a vehicle cabin and generally circulates through an air conditioner unit disposed in the engine room. Accordingly, the chiller that uses the air conditioner refrigerant gas is often disposed in the engine room.

On the other hand, a battery pack including the battery described above is generally provided in a place that differs from the engine room, such as under the floor.

Accordingly, since there is a certain distance between the chiller and the battery pack, the flow path that couples the chiller and the battery pack to each other becomes longer, the temperature of the cooling fluid cooled by the chiller rises before the cooling fluid reaches the battery pack, and the cooling efficiency may be reduced.

It is desirable to provide a structure that can efficiently cool a battery pack.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The structure of a vehicle battery pack 1 according to an embodiment will be described with reference to the accompanying drawings.

The vehicle battery pack 1 includes a battery for supplying electric power to an electric motor of an electrically-driven vehicle, such as a hybrid vehicle or an electric vehicle in which wheels can be driven by the power of the electric motor.

Figure 1:
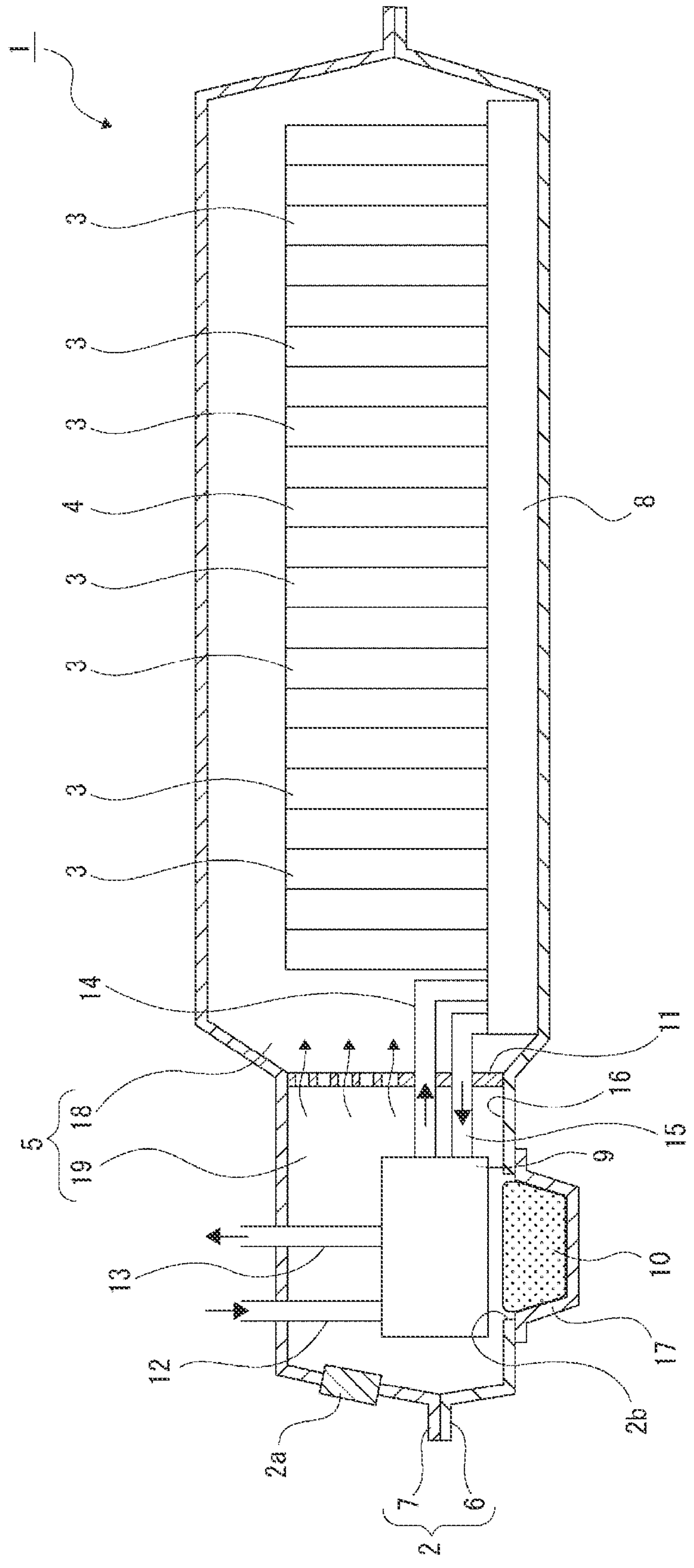
FIG. 1 is a diagram illustrating the structure of a vehicle battery pack installed in a vehicle according to an embodiment.

For example, the vehicle battery pack 1 includes a case 2 and one or more battery modules 4 each including battery cells 3, and the battery modules 4 are disposed in an internal space 5 of the case 2 (see FIG. 1).

The battery module 4 is an assembled battery in which the battery cells 3 are coupled to each other in parallel or in series.

The case 2 includes a lower case 6 that has an upward opening and an upper case 7 that blocks this opening from above.

The lower case 6 and the upper case 7 are joined to each other in a suitable manner such that the case 2 has a watertight structure, and accordingly, water droplets, dust, and the like are prevented from entering the internal space 5 from the outside of the joint portion.

A part of the case 2 on the vehicle front side has a breather valve 2*a* that takes in air from the external space to the internal space 5 or releases air from the internal space 5 to the external space according to a change in the pressure in the internal space 5.

The vehicle battery pack 1 further includes a cooling unit 8, a chiller 9, a water absorbing material 10, and a partition plate 11.

The cooling unit 8 has a flat rectangular shape and is in contact with the lower surfaces of the battery module 4. The cooling unit 8 cools the battery module 4 from below by circulating a fluid (referred to below as a cooling fluid) for cooling therethrough.

The chiller 9 is disposed on the vehicle front side of the battery module 4 and on the vehicle rear side of the breather valve 2*a*, and the air conditioner refrigerant (referred to below as the AC refrigerant) supplied from the engine room and the cooling fluid described above circulate through the chiller 9.

For example, an inflow duct 12 through which the AC refrigerant flows into the chiller 9 and an outflow duct 13 through which the AC refrigerant flows out from the chiller 9 are coupled to the chiller 9.

In addition, a delivery duct 14 through which the cooling fluid is delivered from the chiller 9 to the cooling unit 8 and a reflux duct 15 through which the cooling fluid is returned from the cooling unit 8 to the chiller 9 are coupled to the cooling unit 8 and the chiller 9.

The chiller 9 cools the cooling fluid by heat exchange between the cooling fluid returned from the cooling unit 8 through the reflux duct 15 after being heated to high temperature and the low-temperature AC refrigerant supplied through the inflow duct 12. As a result, the cooling fluid having low temperature is supplied again to the cooling unit 8 through the delivery duct 14.

A water absorbing material 10 is provided below the chiller 9. The water absorbing material 10 is, for example, super absorbent polymer (SAP). However, the water absorbing material 10 is not limited to SAP as long as having a function of absorbing moisture.

The chiller 9 is cooled by the low-temperature AC refrigerant. The air in the external space that flows into the internal space 5 of the case 2 through the breather valve 2*a* is cooled when passing through the vicinity of the chiller 9 and reaches the vicinity of the battery module 4.

The air in the external space may be moist, and condensation occurs near the chiller 9 when such air enters the internal space 5 through the breather valve 2*a*.

The water absorbing material 10 is provided so as not to move the water droplets caused by such condensation to the vicinity of the battery module 4 and is disposed below the chiller 9 so as to appropriately absorb the water droplets that have adhered to the surface of the chiller 9 and then dripped downward by gravity.

A hole 2*b* is provided in a floor surface 16 part of the lower case 6 of the case 2 that corresponds to the chiller 9, and a lid 17 that blocks the hole 2*b* from below is attached to a lower portion of the lower case 6. The lid 17 is detachably attached to the case 2.

The water absorbing material 10 is disposed on the upper surface of the lid 17, and the water absorbing material 10 containing water up to the limit can be replaced by removing the lid 17 from the case 2.

The partition plate 11 is provided so as to divide the internal space 5 of the vehicle battery pack 1 into two spaces. The space that is disposed on the vehicle rear side divided by the partition plate 11 and in which the battery module 4 is disposed is a first space 18, and the space that is disposed on the vehicle front side of the first space 18 and in which the chiller 9 is disposed is a second space 19.

Figure 2:
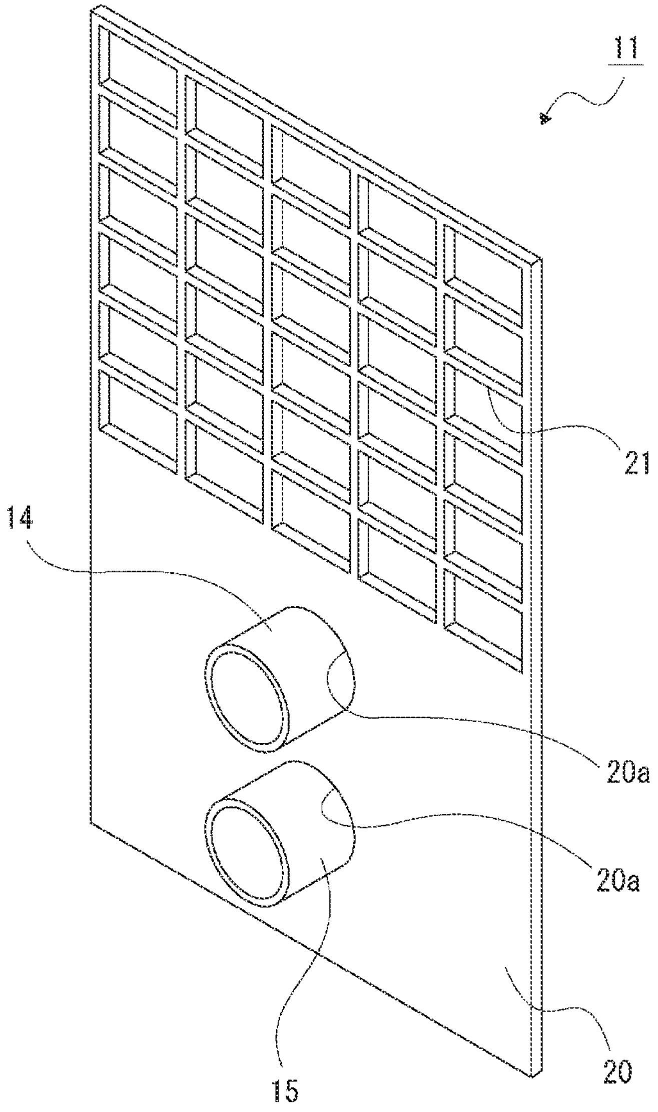
FIG. 2 is a schematic perspective view illustrating an example of the structure of a partition plate.

FIG. 2 illustrates the structure of the partition plate 11.

The lower portion of the partition plate 11 is a non-communication portion 20 through which air does not pass, and the upper portion of the non-communication portion 20 is a communication portion 21 through which air passes.

The non-communication portion 20 of the partition plate 11 is provided to prevent the moisture not absorbed by the water absorbing material 10 from moving from the second space 19 to the first space 18.

In addition, the communication portion 21 of the partition plate 11 is provided to enable air to flow into the first space 18 from the second space 19 or air to flow into the second space 19 from the first space 18 according to the change in the pressure in the first space 18.

The communication portion 21 may have any shape as long as air can pass therethrough. Although the communication portion 21 is formed in a grid pattern in FIG. 2, but the communication portion 21 may have circular air vents through which air passes.

It is be noted that the non-communication portion 20 has duct holes 20*a* through which the delivery duct 14 and the reflux duct 15 pass. However, the delivery duct 14 and the reflux duct 15 may be disposed so as to pass through a part of the communication portion 21 without the duct holes 20*a* being provided in the non-communication portion 20. In this case, since the process for forming the duct holes 20*a* in the non-communication portion 20 is unnecessary, components can be simplified and the cost can be reduced.

In addition, the partition plate 11 may simply have the non-communication portion 20. At this time, the space above the partition plate 11 is used as the communication portion 21 through which air can move by making the height of the partition plate 11 smaller than the height of an internal space 5 part in which the partition plate 11 is disposed. This enables air to move between the first space 18 and the second space 19.

It is be noted that the partition plate 11 illustrated in FIG. 1 is disposed at a position higher than the lid 17. As a result, since the partition plate 11 is disposed at a position higher than the water absorbing material 10 disposed on the lid 17, the moisture absorbed by the water absorbing material 10 is less likely to move to the first space 18.

In addition, since the lid 17 is located below the floor surface 16 formed in, for example, a bowl shape, the moisture absorbed by the water absorbing material 10 is less likely to leak to the outside of the lid 17. This further makes water droplets less likely to move to the first space 18.

The vehicle battery pack 1 further includes various units, such as a battery electronic control unit (battery ECU), a temperature sensor, and a pump, which are not illustrated, in addition to the components described above.

The structure of a vehicle battery pack 1A according to a further embodiment will be described with reference to FIG. 3. The vehicle battery pack 1A according to the second embodiment differs from the vehicle battery pack 1 according to the first embodiment in that the chiller 9 is disposed in the external space.

It is be noted that the components similar to those in the first embodiment will not be described as appropriate.

The vehicle battery pack 1A includes the case 2 that includes the lower case 6 and the upper case 7, the one or more battery modules 4 each including the battery cells 3, the cooling unit 8 that cools the battery modules 4, the chiller 9 that cools the cooling medium circulating through the cooling unit 8, the water absorbing material 10 disposed below the chiller 9, the partition plate 11 that separates the first space 18 from the second space 19, and the lid 17 that blocks, from below, the hole 2*b* provided in the floor surface 16 of the lower case 6 and in which the water absorbing material 10 is disposed.

The chiller 9 is disposed with the lower surface 9*a* thereof in contact with the upper portion of the top plate 22 of the upper case 7 in the second space 19.

For example, the top plate 22 located above the second space 19 is provided as a disposition recess 2*c* in which the chiller 9 is disposed. When the chiller 9 is disposed in the disposition recess 2*c*, the disposition state thereof becomes stable.

Fins 23 project downward from the lower surface of the top plate 22.

The fins 23 are made of metal plates and are cooled by the chiller 9 via the top plate 22.

The fins 23 are, for example, staggered as viewed from the vehicle front side such that the air flowing into the second space from the external space through the breather valve 2*a* passes through the vicinity of the fins 23. As a result, the inflowing air passes between the fins 23 in a meandering manner and is efficiently cooled and dehumidified.

It is be noted that the moisture liquefied by dehumidification adheres to the surfaces of the fins 23 and drip downward due to gravity. The water absorbing material 10 is provided below the fins 23 so as to efficiently absorb the moisture dripped from the fins 23.

The upper case 7 of the case 2 has duct holes 2*d* through which the delivery duct 14 and the reflux duct 15 that couple the chiller 9 and the cooling unit 8 to each other pass.

Since the chiller 9 is provided outside the case 2 as described above, the chiller 9 can be easily replaced.

Figure 4:
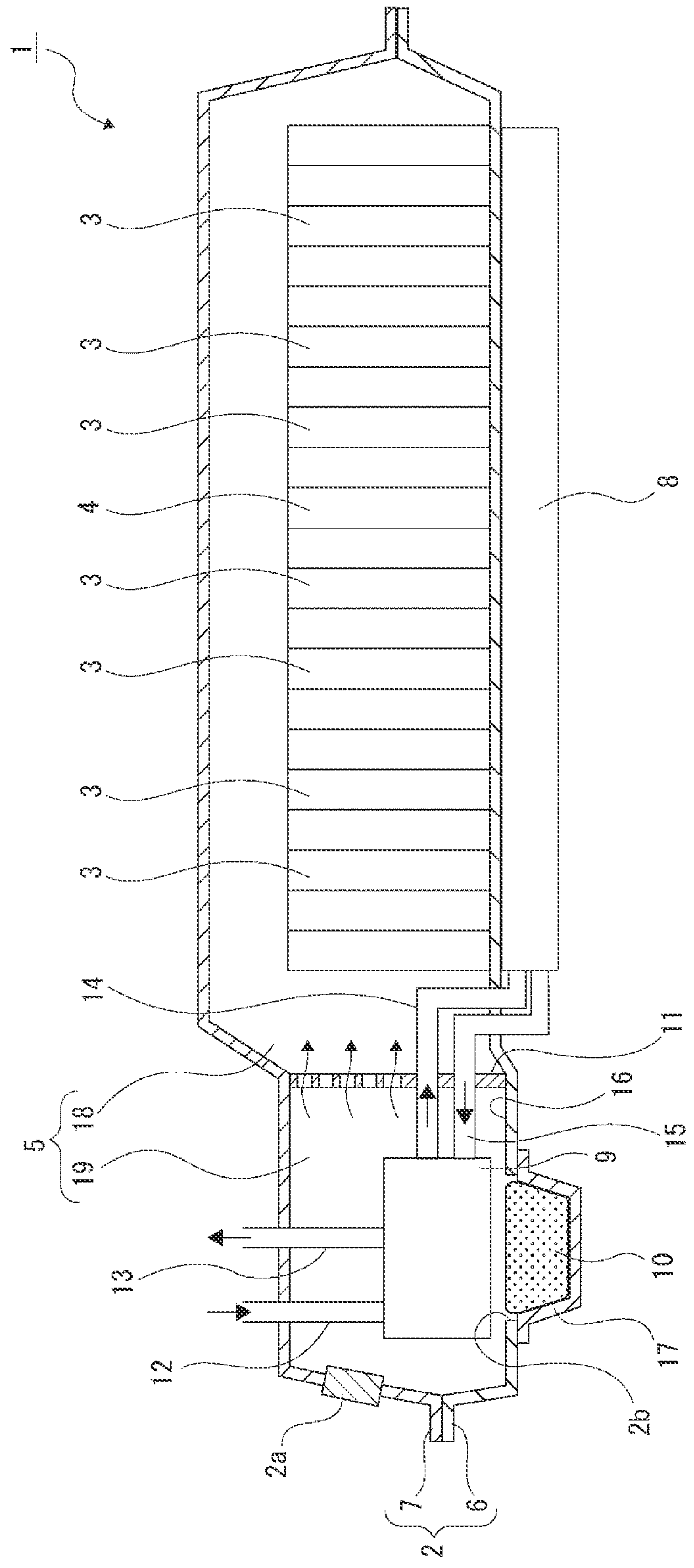
FIG. 4 is a diagram illustrating the structure of a vehicle battery pack according to a modified example.

The cooling unit 8 is disposed in the internal space 5 of the case 2 in the example described above, but the cooling unit 8 may be disposed in the external space as illustrated in FIG. 4.

When the cooling unit 8 is disposed in the external space of the case 2, even if the cooling unit 8 is damaged and the cooling fluid circulating through the cooling unit 8 leaks to the outside of the cooling unit 8, the cooling fluid does not easily enter the case 2, and the cooling fluid is prevented from adhering to the battery module 4. As a result, occurrence of electric leakage or the like in the battery module 4 can be suppressed.

Figure 3:
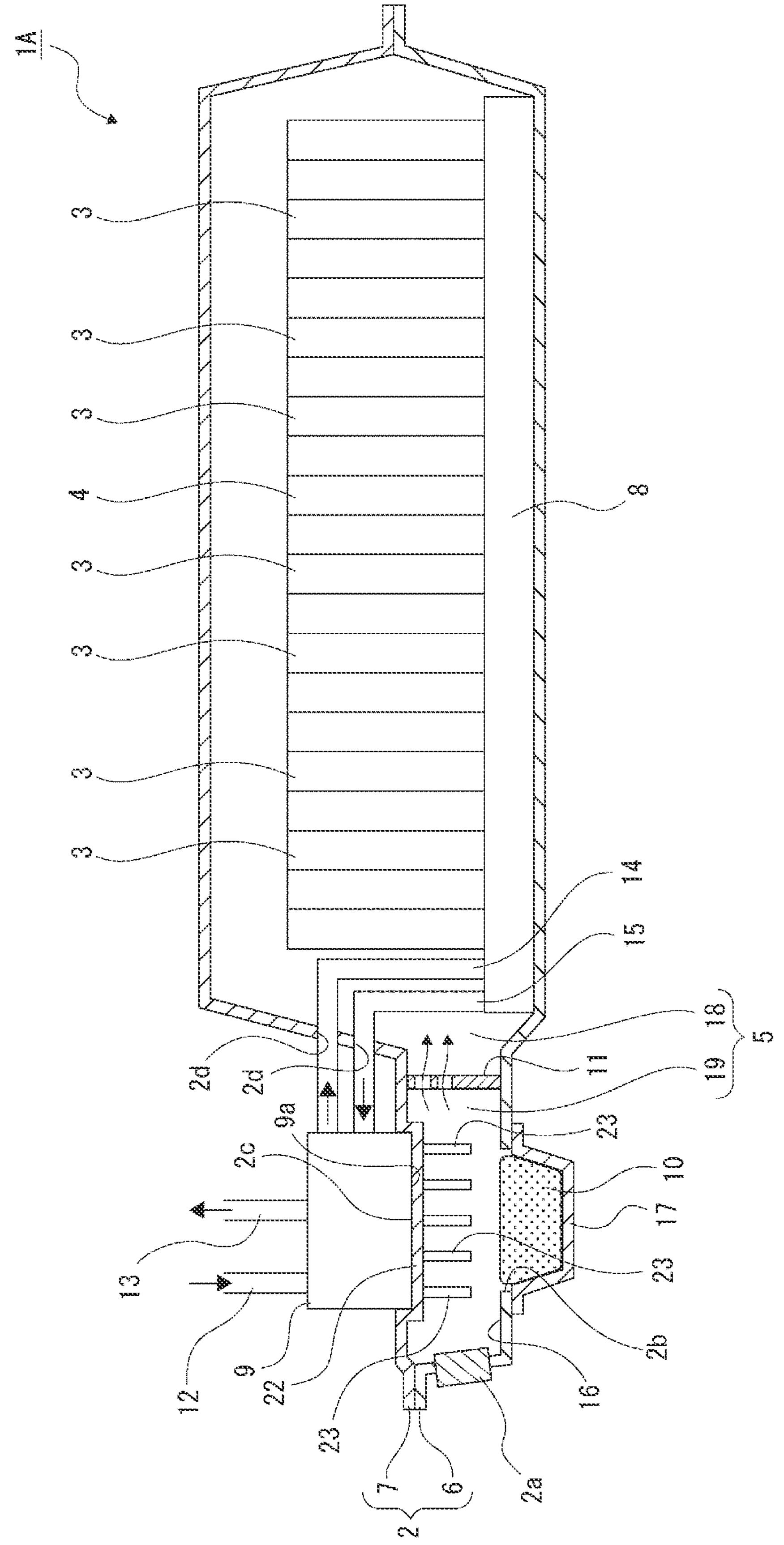
FIG. 3 is a diagram illustrating the structure of a vehicle battery pack according to an embodiment.

It is be noted that both the cooling unit 8 and the chiller 9 may be disposed in the external space of the case 2 by applying the disposition form of the cooling unit 8 illustrated in FIG. 4 to the vehicle battery pack 1A according to the second embodiment illustrated in FIG. 3.

Since both the cooling unit 8 and the chiller 9 are disposed outside the case 2, occurrence of electric leakage and the like due to the outflow of the cooling fluid can be more effectively prevented.

It is be noted that, in FIG. 4, the lower surface of the floor surface of the lower case 6 that forms the first space 18 has a recess that projects upward. The cooling unit 8 is disposed in this recess. This makes the disposition state of the cooling unit 8 stable.

Although the water absorbing material 10 is provided below the chiller 9 in the examples described above, the vehicle battery pack 1 (1A) may have a mechanism for discharging the moisture that has dripped below the chiller 9 to the outside of the case 2, for example, the outside of the vehicle, instead of having the water absorbing material 10.

In the examples described above, the breather valve 2*a* is provided in the case 2. Here, it is assumed that the breather valve 2*a* is a valve mechanism that opens and closes, but the breather valve 2*a* is not limited to this example and may be a simple hole provided in the case 2. In addition, a filter or the like through which air passes but water droplets do not pass may be fitted in the hole.

As described in the examples described above, the vehicle battery pack 1 (1A) includes the battery module 4 each having the battery cells 3, the case 2 having the internal space 5 in which the battery module 4 is disposed and the breather valve 2*a* through which the internal space 5 communicates with the external space, the cooling unit 8 cooling the battery module 4 by using the fluid (cooling fluid), and the chiller 9 taking heat from the fluid by heat exchange. In addition, the chiller 9 is provided closer to the breather valve 2*a* than the battery module 4.

As a result, the chiller 9 is disposed near or inside the case 2.

Accordingly, the path for the cooling fluid from the chiller 9 to the cooling unit 8 is shortened, the temperature rise of the fluid during flowing in the path can be suppressed, and the cooling efficiency can be improved.

In addition, the air flowing into the internal space 5 of the case 2 through the breather valve 2*a* can pass through the vicinity of the chiller 9 and then reach the vicinity of the battery module 4.

Accordingly, since the inflowing air is cooled and dehumidified by the cold chiller 9 and then reaches the vicinity of the battery module 4, both the cooling unit 8 and the inflowing air can be used to cool the battery module 4, occurrence of condensation and adherence of water droplets to the battery module 4 can be prevented. That is, problems, such as electric leakage in the battery module 4, can be prevented.

It is be noted that the chiller 9 is disposed closer to the vehicle front side than the battery module 4, so the distance to the air conditioner unit disposed in the engine room in front portion of the vehicle becomes as short as possible. Accordingly, the length of pipe for sending the AC refrigerant to the chiller 9 can be shortened.

In addition, in the vehicle battery pack 1 (1A), the partition plate 11 may be provided to divide the internal space 5 into the first space 18 in which the battery module 4 is disposed and the second space 19 in which the breather valve 2*a* is provided, the partition plate 11 may have the non-communication portion 20 that is in contact with the floor surface 16 of the case 2 and through which air cannot move between the first space 18 and the second space 19, the space above the non-communication portion 20 may be provided as the communication portion 21 through which air can move between the first space 18 and the second space 19, and the chiller 9 may be located closer to the breather valve 2*a* than the partition plate 11.

The partition plate 11 can prevent water droplets generated by condensation in the second space 19 located near the chiller 9 from flowing into the first space 18 and prevent electric leakage and the like in the battery module 4.

In addition, in the vehicle battery pack 1A, the bottom surface of the chiller 9 may be disposed adjacent to (in contact with) the upper surface of the top plate 22 of the case 2, which forms the ceiling of the internal space 5, and the fins 23 projecting downward may be provided on the lower surface of the top plate 22.

That is, the chiller 9 is disposed adjacent to the upper surface of the case 2 in the external space of the case 2. As a result, the top plate 22 of the case 2 in the second space 19 is cooled by the chiller 9. In addition, the fins 23 projecting downward from the top plate 22 is also cooled at the same time.

Since the surface area of the fins 23 is larger than the surface area of the top plate 22, the air having flowed into the internal space 5 (second space 19) through the breather valve 2*a* can be efficiently cooled, and the dehumidification efficiency of the inflowing air can be improved.

In addition, in the vehicle battery pack 1 (1A), the water absorbing material 10 may be disposed below the chiller 9 in the case 2.

As a result, water droplets generated by condensation in the second space 19 are absorbed by the water absorbing material 10, and the water droplets can be prevented from entering the first space 18.

Furthermore, in the vehicle battery pack 1 (1A), the water absorbing material 10 may be disposed on the lid 17, which can be attached to and detached from the case 2 from below.

The water absorbing material 10 can be taken from the case 2 by removing the lid 17 from the case 2. Accordingly, the water absorbing material 10 can be easily replaced, and the water absorbing material 10 can be easily maintained to absorb moisture.

It is be noted that the various examples described above can be combined as appropriate.

According to embodiments of the disclosure, the structure capable of efficiently cooling the battery pack can be proposed.

The invention claimed is:

1. A vehicle battery pack comprising:
- a battery module comprising battery cells;
- a case having an internal space in which the battery module is disposed, the case comprising a breather valve through which the internal space communicates with an external space;
- a cooling unit configured to cool the battery module by using a fluid; and
- a chiller configured to take heat from the fluid by heat exchange,
- wherein the chiller is provided closer to the breather valve than the battery module.

2. The vehicle battery pack according to claim 1, further comprising:
- a partition plate that divides the internal space into a first space in which the battery module is disposed and a second space in which the breather valve is provided,
- wherein the partition plate has a non-communication portion through which air does not move between the first space and the second space, the non-communication portion being disposed in contact with a floor surface of the case,
- a space above the non-communication portion is provided as a communication portion through which air moves between the first space and the second space, and
- the chiller is located closer to the breather valve than the partition plate.

3. The vehicle battery pack according to claim 1, wherein
- the chiller is disposed such that a lower surface of the chiller is disposed adjacent to an upper surface of a top plate of the case, and
- a fin projecting downward is provided on a lower surface of the top plate.

4. The vehicle battery pack according to claim 1,
- wherein a water absorbing material is installed below the chiller in the case.

5. The vehicle battery pack according to claim 2,
- wherein a water absorbing material is installed below the chiller in the case.

6. The vehicle battery pack according to claim 3,
- wherein a water absorbing material is installed below the chiller in the case.

7. The vehicle battery pack according to claim 4,
- wherein the water absorbing material is disposed on a lid that is attachable to and detachable from the case from below.

* * * * *